United States Patent [19]

Salidrigas

[11] Patent Number: 5,150,667
[45] Date of Patent: Sep. 29, 1992

[54] RESTRAINING APPARATUS FOR SMALL ANIMALS

[76] Inventor: Cecilia Salidrigas, 7519 Palm Rd., West Palm Beach, Fla. 33406

[21] Appl. No.: 802,103
[22] Filed: Dec. 4, 1991
[51] Int. Cl.$^5$ .............................................. A01K 29/00
[52] U.S. Cl. .................................................... 119/96
[58] Field of Search ................ 119/101, 96, 102, 106, 119/109, 126, 127, 128; 54/1, 71; 128/75, 875, 876; 272/70 A, 70, 70.4, 70.3; 297/468, 483, 484, 486; 280/727, 801, 809

[56] References Cited

U.S. PATENT DOCUMENTS

| | | | |
|---|---|---|---|
| 613,334 | 11/1898 | Thompson et al. | 128/875 |
| 1,685,435 | 9/1928 | Philbrick | 54/71 |
| 2,670,712 | 3/1954 | Patience et al. | 54/71 |
| 3,769,939 | 11/1973 | Wais et al. | 119/106 |
| 3,994,264 | 11/1976 | Flynt | 119/126 X |
| 4,303,041 | 12/1981 | Thompson et al. | 119/96 |
| 4,559,906 | 12/1985 | Smith | 119/96 |
| 4,655,172 | 4/1987 | King | 119/96 |
| 4,896,630 | 1/1990 | Luce | 119/96 |
| 4,970,991 | 11/1990 | Luce | 119/96 |

FOREIGN PATENT DOCUMENTS

| | | | |
|---|---|---|---|
| 1174917 | 9/1984 | Canada | 119/96 |
| 9426 | of 1909 | United Kingdom | 128/875 |

Primary Examiner—Gene Mancene
Assistant Examiner—Thomas Price
Attorney, Agent, or Firm—Henderson & Sturm

[57] ABSTRACT

An animal restraining apparatus (10) including a pair of leg encircling members (20) connected together on their lower portions by a pair of elongated straps (31) and connected together on their upper portions by a shoulder engaging unit (13) provided with a ring element (45) adapted to be connected to a conventional leash (50); wherein, the apparatus (10) is designed to restrain an animal (100) without applying any choking forces.

8 Claims, 1 Drawing Sheet

RESTRAINING APPARATUS FOR SMALL ANIMALS

TECHNICAL FIELD

The present invention relates to the field of animal harness arrangements in general, and in particular to an apparatus designed for small animals such as dogs or cats, which provides means for restraining the animal without applying choking pressure.

BACKGROUND ART

This invention was the subject matter of Document Disclosure Program Registration No. 279,765 which was filed in the U.S. Patent and Trademark Office on Apr. 22, 1991.

As can be seen by reference to the following U.S. Pat. Nos. 4,559,906; 4,655,172; 4,896,630; and 4,970,991; the prior art is replete with myriad and diverse harness devices designed for small animals.

While all of the aforementioned prior art constructions are more than adequate for the basic purpose and function for which they have been specifically designed, these prior art arrangements are provided with collars or neck loops that may, in the normal use of the device, choke the animal wearing it. In addition, these constructions comprise multiple straps and fasteners that fit the animal's body in a complex fashion, not only requiring extensive time to put the device on, or remove it from the animal, but also resulting in higher production and sales costs for the devices.

As a consequence of the foregoing situation, there has existed a longstanding need among small animal owners for a restraining apparatus that is simple, inexpensive, and effective in restraining an animal without causing it to choke; and the provision of such a construction is a stated objective of the present invention.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

DISCLOSURE OF THE INVENTION

Briefly stated, the restraining apparatus that forms the basis of the present invention is a simple, flexible construction which provides means to restrain a small animal without having to resort to the use of a choking force to control the animal.

As will be explained in greater detail further on in the specification, the restraining apparatus of the present invention comprises two leg loop units adapted to be fitted around the forelegs of a small animal. These leg loop units are connected by a chest strap unit and an adjustable shoulder strap unit that has means for attaching a standard leash thereon.

BEST MODE FOR CARRYING OUT THE INVENTION

Figure 1:
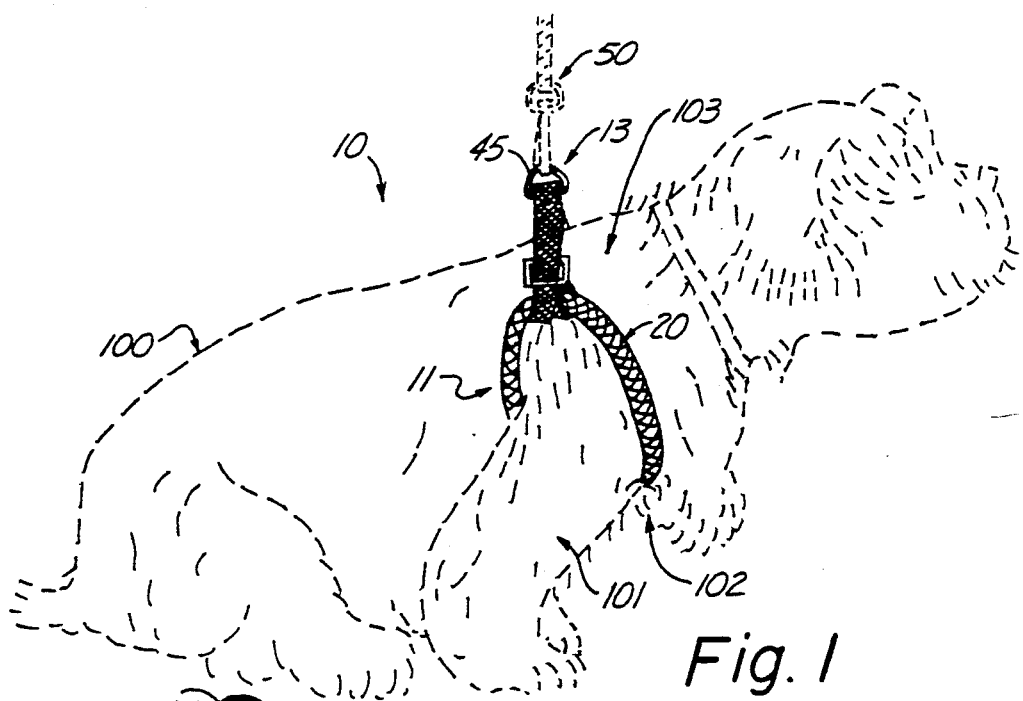
FIG. 1 is a perspective view of the restraining apparatus showing it in use on a small animal.

As can be seen by reference to the drawings, and in particular to FIG. 1, the animal restraining apparatus that forms the basis of the present invention is designated generally by the reference numeral (10). The apparatus (10) comprises in general: a pair of foreleg engaging units (11); a chest engaging unit (12); and a shoulder engaging unit (13). These units will now be described in seriatim fashion.

Figure 2:
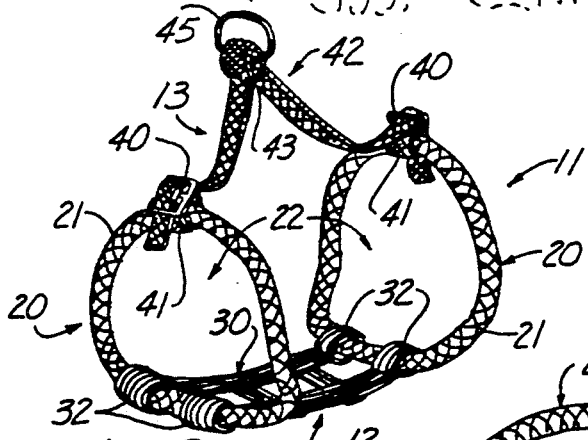
FIG. 2 is an isolated perspective view of the restraining apparatus.
Figure 3:
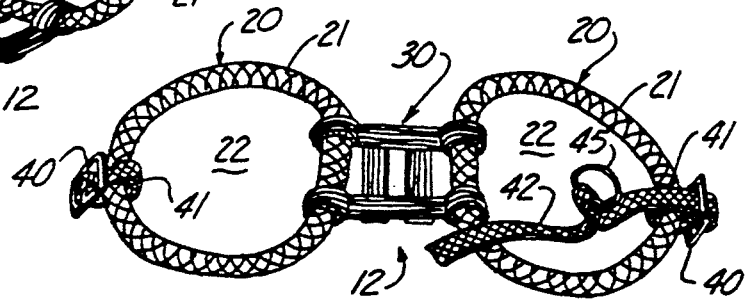
FIG. 3 is a top plan view of the restraining apparatus laid out in a flat disposition; and, FIG. 4 is an isolated detail view of the chest strap member of the apparatus.

As shown in FIGS. 2 and 3, the foreleg engaging units (11) comprise a pair of enlarged generally circular leg engaging members (20) each fabricated from a length of flexible, non-stretchable material (21) such as soft rope, or the like, which is formed into an enlarged closed loop; wherein, the loop openings (22) are dimensioned to loosely encircle the forelegs (101) of an animal (100).

Figure 4:
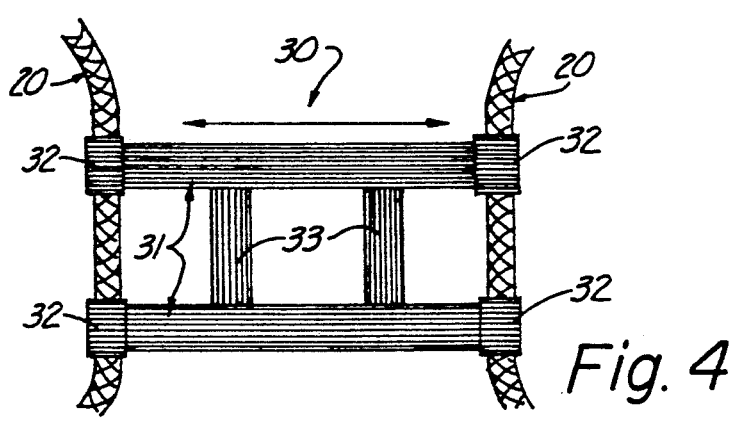

As can best be seen by reference to FIGS. 2 through 4, the chest engaging unit (12) comprises a chest engaging member (30) including a pair of generally elongated straps (31) having looped opposed ends (32) which captively engage, and form the first operative connection between the lower portion of the leg engaging members (20).

In addition, as can best be seen by reference to FIG. 4, the elongated straps (31) are operatively connected together in a generally parallel fashion by a pair of generally short cross-straps (33), whose purpose and function will be described in greater detail further on in the specification.

As shown in FIGS. 2 and 3, the shoulder engaging unit (13) comprises: a pair of buckle members (40) mounted on looped elements (41) which captively engage the upper portions of the leg engaging members (20); and an elongated flexible strap member (42), whose opposite ends are adapted to be releasably engaged by the buckle members (40) in a well-recognized fashion.

In addition, the elongated flexible strap member (42) is further provided with a looped intermediate portion (43) which captively engages a D-ring element (45) that is adapted to be connected to a conventional leash designated generally as (50) in FIG. 1.

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

I claim:

1. An animal restraining apparatus for restraining and controlling an animal without applying any force to the animal's neck; wherein, the apparatus consists of:

a pair of enlarged generally circular leg engaging members wherein each leg engaging member is provided with an upper portion and a lower portion and is dimensioned to loosely surround the animal's foreleg, and to extend substantially around the animals shoulders;

first connection means extending underneath the chest of the animal and operatively engaged with the lower portions of said leg engaging members; and, an elongated flexible strap member having opposite ends provided with adjustment means operatively associated with the upper portions of said leg engaging members and extending across the animals back; wherein, said adjustment means form a second operative connection between the leg engaging members; wherein, said elongated flexible strap member is further provided with a ring element intermediate the opposite ends of the strap member; wherein, the ring element is dimensioned to be engaged by a conventional leash.

2. The apparatus as in claim 1; further comprising at least one other elongated strap disposed generally parallel to said at least one elongated strap; wherein said at least one other elongated strap also has opposite ends that are operatively associated with the lower portions of said leg engaging portions.

3. The apparatus as in claim 2; further comprising at least one cross-strap operatively connected on opposed ends to said at least one and said at least one other elongated straps.

4. The apparatus as in claim 1; wherein said means operatively associated with the upper portions of said leg engaging members comprise buckles attached to the upper portions of the leg engaging members.

5. The apparatus as in claim 1; wherein, said first connection means comprises:
at least one elongated strap having opposite ends that are operatively connected to the lower portion of said leg engaging members.

6. The apparatus as in claim 5; further comprises:
at least one other elongated strap disposed generally parallel to said at least one elongated strap; wherein said at least one other elongated strap also has opposite ends that are operatively associated with the lower portions of said leg engaging portions.

7. The apparatus as in claim 6; further comprising at least one cross-strap operatively connected on opposed ends to said at least one and said at least one other elongated straps.

8. The apparatus as in claim 1; wherein said adjustment means comprise buckles attached to the upper portions of the leg engaging members.

* * * * *